United States Patent [19]

Yamada et al.

[11] Patent Number: 4,984,804

[45] Date of Patent: Jan. 15, 1991

[54] GOLF BALL

[75] Inventors: Mikio Yamada, Kobe; Yoshinobu Nakamura, Nishinomiya, both of Japan

[73] Assignee: Sumitomo Rubber Industries, Ltd., Hyogo, Japan

[21] Appl. No.: 417,302

[22] Filed: Oct. 5, 1989

[30] Foreign Application Priority Data

Oct. 17, 1988 [JP] Japan .................................. 63-262290

[51] Int. Cl.$^5$ .............................................. A63B 37/12
[52] U.S. Cl. .................................. 273/235 R; 525/196; 524/908; 260/998.14
[58] Field of Search ................ 525/196, 195; 524/908; 260/998.14; 273/235 R

[56] References Cited

U.S. PATENT DOCUMENTS

| 3,940,146 | 2/1976 | Little | 260/998.14 |
| 4,323,247 | 4/1982 | Keches et al. | 273/235 R |
| 4,337,947 | 7/1982 | Saito et al. | 260/998.14 |
| 4,526,375 | 7/1985 | Nakade . | |
| 4,567,219 | 1/1986 | Tominaga et al. | 524/908 |

Primary Examiner—Allan M. Lieberman
Attorney, Agent, or Firm—Birch, Stewart, Kolasch & Birch

[57] ABSTRACT

The present invention provides a golf ball covering with a special ionomer resin mixture having improved properties. The special ionomer resin mixture has a melt index of 0.5 to 3.0 and a Shore D hardness of at least 65, and is prepared by mixing three ionomer resins in specific amount ratios.

17 Claims, 1 Drawing Sheet

GOLF BALL

FIELD OF THE INVENTION

Figure 1:
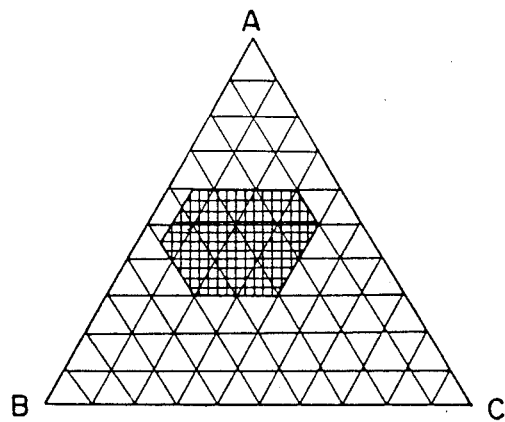
FIG. 1 shows a triangular diagram of the ionomer resin amount ratio.

The present invention relates to a golf ball which comprises a core and a specific cover material covering the core.

BACKGROUND OF THE INVENTION

Ionomer resins are olefin polymers in which linkage is ionic. They are excellent in toughness and elasticity, and very useful in many fields.

There are two kinds of ionomer resins which are commercially available. One is an ionomer resin in which carboxyl groups are neutralized with sodium (hereinafter sodium neutralized ionomer resin), and the other is an ionomer resin in which carboxyl groups are neutralized with zinc (hereinafter zinc neutralized ionomer resin). The sodium neutralized one is superior in impact resilience to the zinc neutralized one, but inferior in low temperature durability.

In order to obviate the above defects, it is proposed that the sodium neutralized ionomer resin be mixed with the zinc neutralized ionomer resin. The mixed ionomer resin, when used as a cover of golf balls, however, reduces fatigue life against repeated stress. Also, since a combination to be mixed of the ionomer resins is very limited, it is difficult to freely design an ionomer resin mixture having desired physical properties.

U.S. Pat. No. 4,526,375 proposes that an oxide of zinc or magnesium be formulated into the sodium neutralized ionomer resin to neutralize remaining free carboxyl groups of the sodium neutralized ionomer resin with zinc or magnesium. The obtained ionomer resin has improved low temperature durability without hurting impact resilience. It, however, is still desired to improve impact resilience and ambient temperature durability.

SUMMARY OF THE INVENTION

The present invention provides a golf ball covering with a special ionomer resin mixture having more improved properties. The special ionomer resin mixture has a melt index of 0.5 to 3.0 and a Shore D hardness of at least 65, and is prepared by mixing (A) an ionomer resin having a melt index of 0.5 to 5.0 and a Shore D hardness of at least 65, prepared from an ethylene-methacrylic acid copolymer containing 10 to 20% by weight of methacrylic acid with the balance ethylene of which 20 to 70 mol % of the carboxyl groups is neutralized with sodium ions, (B) an ionomer resin having a melt index of 0.5 to 3.0 and a Shore D hardness of at least 65, prepared from the ethylene-methacrylic acid copolymer of which 40 to 70 mol % of the carboxyl groups is neutralized with zinc ions or magnesium ions, and (C) an ionomer resin having a melt index of 0.1 to 2.0 and a Shore D hardness of at least 65, prepared from an ethylene-methacrylic acid copolymer of which 10 to 50 mol % of the carboxyl groups is neutralized with sodium ions and 10 to 50 mol % of the carboxyl groups is neutralized with zinc ions or magnesium ions, in an amount ratio which meets the following relationships;

$$30 \leq A \leq 60$$

$$10 \leq B \leq 50$$

$$5 \leq C \leq 40$$

$$A+B+C=100 (\% \text{ by weight}).$$

DETAILED DESCRIPTION OF THE INVENTION

The ionomer resin is prepared from a an ethylene-methacrylic acid copolymer containing 10 to 20% by weight of methacrylic acid with the balance of ethylene. If the amount of methacrylic acid is less than 10% by weight, stiffness is poor. If it is more than 20% by weight, stiffness is too high and feeling upon hitting the ball is poor.

The ionomer resin A employed in the present invention has carboxyl groups of which 20 to 70 mol %, preferably 30 to 60 mol %, is neutralized with sodium ion. Neutralization can be carried out by mixing a sodium ion source with the ethylene-methacrylic acid copolymer at molten states. Sodium ion sources include NaOH, $Na_2CO_3$, $NaOCH_3$, $CH_3COONa$ etc. Neutralizing amounts of less than 20 mol % reduce stiffness and impact resilience. If the neutralizing amount is more than 70 mol %, stiffness is too high and feeling upon hitting the ball is poor. Since the flowability of the resin is significantly lowered, it is difficult to be formed in a shape and impact resistance is also deteriorated. The ionomer resin A of the present invention is also required to have a melt index of 0.5 to 5.0, preferably 0.8 to 3.0. The melt index is determined at a temperature of 190° C. and at a load of 2.160 Kg according to JIS-K 6760. If the melt index is less than 0.5, its flowability is too low and it is difficult to form shape. Impact resistance is also deteriorated. If it is more than 5.0, both impact resilience and impact resistance are deteriorated. The ionomer resin A should have a Shore D hardness of at least 65. The hardness of less than 65 deteriorates impact resilience.

Such sodium neutralized ionomer resins are commercially available from Du Pont-Mitsui Polychemicals Company, Ltd. as HIMILAN 1601, 1605 which is preferred, and 1707.

The ionomer resin B employed in the present invention has carboxyl groups neutralized with zinc or magnesium ion in an amount of 40 to 70 mol %, preferably 50 to 60 mol % based on the total amount of the carboxyl groups. If the neutralizing amount is less than 40 mol %, stiffness is too low and impact resilience is lowered. If it is more than 70 mol %, stiffness is too high and feeling at hitting the ball is poor. The flowability is very low and it is difficult to form shape. Neutralization can be carried out by mixing the ethylene-methacrylic acid copolymer with zinc or magnesium ion sources at molten states. Examples of the zinc ion sources are zinc carbonate, zinc acetate and the like. Examples of the magnesium ion sources are magnesium hydroxide, magnesium oxide and magnesium acetate. Such zinc neutralized ionomer resins are commercially available from Du Pont-Mitsui Polychemicals Company, Ltd. as HIMILAN 1706 and the like. The ionomer resin B may also be prepared by treating the sodium neutralized ionomer resin to remove sodium ions and then mixing the zinc or magnesium ion sources. The ionomer resin B of the present invention is also required to have a melt index of 0.5 to 3.0, preferably 0.8 to 2.0. If the melt index is less than 0.5, its flowability is too low and it is difficult to form shape. Impact resistance is also deteriorated. If it is more than 3.0, both impact resilience and impact resistance are deteriorated. The ionomer resin A should have a Shore D hardness of at least 65. The hardness of less than 65 deteriorates impact resilience.

The ionomer resin C employed in the present invention can be prepared by further neutralizing with zinc or magnesium ion an ionomer resin which has been neutralized with sodium ion in an amount of 10 to 50 mol %, preferably 20 to 40 mol % based on the total amount of the carboxyl group in the ionomer resin. The neutralization can be carried out as generally explained for the ionomer resin B. The ionomer resin C of the present invention is also required to have a melt index of 0.1 to 2.0, preferably 0.5 to 1.5. If the melt index is less than 0.1, its flowability is too low and it is difficult to form shape. Impact resistance is also deteriorated. If it is more than 2.0, both impact resilience and impact resistance are deteriorated. The ionomer resin A should have a Shore D hardness of at least 65. The hardness of less than 65 deteriorates impact resilience.

The cover resin composition employed in the present invention is a mixture of the three ionomer resins A, B and C. An amount ratio of the three ionomer resins A, B and C satisfies the following relation;

$$30 \leq A \leq 60$$

$$10 \leq B \leq 50$$

$$5 \leq C \leq 40$$

$$A + B + C = 100 (\% \text{ by weight})$$

The cover resin composition of the present invention is also required to have a melt index of 0.5 to 3.0, preferably 1.0 to 2.5. If the melt index is less than 0.5, its flowability is too low and ir is difficult to form shape. Impact resistance is also deteriorated. If it is more than 3.0, both impact resilience and impact resistance are deteriorated. The ionomer resin A should have a Shore D hardness of at least 65. The hardness of less than 65 deteriorates impact resilience. Mixing of the ionomer resins A, B and C may be carried out using an extruder, such as a single screw extruder or a twin screw extruder which is preferred.

The cover resin composition may further contain additives, if necessary. Examples of the additives are a pigment, a lubricant, a dispersant (calcium stearate etc.), an antioxidant, a stabilizer, a UV absorber, an antistat and the like.

The golf ball of the present invention can be prepared by covering a golf ball core with the cover resin composition. The covering method can be any methods used in this field, generally a injection molding. The golf ball core can be either a solid core which is solidly molded from rubber, or a thread-wound core which is prepare by winding rubber thread on a center material.

The golf ball of the present invention has much improved rebound characteristics and excellent durability.

EXAMPLES

The present invention is illustrated with the following examples which, however, are not to be construed as limiting the present invention to their details.

Examples 1 to 4 and Comparative Examples 1 to 14

Preparation of a core

A rubber composition was prepared by mixing 100 parts by weight of polybutadiene (available from Japan Synthetic Rubber Co., Ltd. as JSR BR01), 37 parts by weight of zinc acrylate (available from Arco Chemical Company as CHEMLINK RT), 0.5 parts by weight of an antioxidant (available from Yoshitomi Pharmaceutical Co., Ltd. as Yoshinox 425) and 6 parts by weight of dicumyl peroxide. The composition was vulcanized at 166° C. for 15 minutes to form a solid core having an average diameter of 38.4 mm.

Preparation of cover resins

Three ionomer resins (1), (2) and (3) were prepared by mixing the ingredients shown in Table 1 in a twin screw extruder. Extruding conditions were a screw diameter of 45 mm, a screw rotating rate of 200 rpm and a screw L/D of 30. The cylinder temperature condition were as follow;

| Barrel | 1 | 2 | 3 | 4 | 5 | 6 | 7 | Die |
|---|---|---|---|---|---|---|---|---|
| Temp.(°C.) | 200 | 200 | 200 | 230 | 250 | 250 | 250 | 250 |

TABLE 1

| | Resin (1) | Resin (2) | Resin (3) |
|---|---|---|---|
| HIMILAN 1605 | 100 | 100 | — |
| Magnesium hydroxide | 1 | — | 3 |
| Basic zinc carbonate | — | 1.5 | — |
| HIMILAN 1605 treated with nitric acid* | — | — | 98 |

*Pellets of HIMILAN 1605 were ground to powder and added into a 3.5 N nitric acid solution. The solution was heated to reflux for 24 hours and then rinsed with water and dried. In this treatment, metal ions were removed from the ionomer resin to reproduce ethylene-methacrylic acid copolymer.

Preparation of a golf ball

The core was covered with a cover resin mixture shown in Table 2 by injection molding to form a golf ball. Mixing of the ionomer resins in Table 2 was conducted in the same conditions as the ionomer resins of Table 1.

TABLE 2

| Ionomer resin | Resin name | Examples No. | | | | Comparative Examples | | | | | | |
|---|---|---|---|---|---|---|---|---|---|---|---|---|
| | | 1 | 2 | 3 | 4 | 1 | 2 | 3 | 4 | 5 | 6 | 7 |
| A | HIMILAN 1605[1] | 30 | 45 | 60 | 40 | 100 | | | | | | 50 |
| B | Resin (3)[2] | 40 | | | 20 | | 100 | | | | | 50 |
| B | HIMILAN 1706[3] | | 35 | 30 | | | | 100 | | | | |
| C | Resin (1)[4] | 30 | 20 | | | | | | 100 | | | |
| C | Resin (2)[5] | | | 10 | 40 | | | | | 100 | | |
| | HIMILAN 1555[6] | | | | | | | | | | 50 | |
| | HIMILAN 1557[7] | | | | | | | | | | 50 | |
| Melt index of cover resin | | 1.8 | 1.6 | 1.8 | 1.7 | 2.8 | 1.9 | 0.9 | 0.9 | 0.9 | 7.5 | 2.2 |
| Hardness (Shore D) of cover resin | | 71 | 71 | 71 | 70 | 69 | 69 | 68 | 69 | 69 | 64 | 69 |

TABLE 2-continued

| | | | | | | | | | | | |
|---|---|---|---|---|---|---|---|---|---|---|---|
| Ball weight (g) | | 45.3 | 45.3 | 45.3 | 45.3 | 45.3 | 45.3 | 45.2 | 45.2 | 45.2 | 45.5 | 45.4 |
| Ball compression (PGA) | | 100 | 100 | 100 | 100 | 98 | 98 | 96 | 98 | 99 | 94 | 98 |
| Ball initial velocity[7] (feet/sec.) | | 254.3 | 254.4 | 254.4 | 254.3 | 253.8 | 253.5 | 253.2 | 253.8 | 253.8 | 252.9 | 253.7 |
| Durability[9] | | 100 | 102 | 101 | 100 | 97 | 98 | 94 | 99 | 99 | 102 | 98 |
| Low temperature durability[10] | | No cracks | No cracks | No cracks | No cracks | All cracks | No cracks | No cracks | No cracks | No cracks | 10% cracks | No cracks |

| | | | Comparative Examples No. | | | | | | |
|---|---|---|---|---|---|---|---|---|---|
| | Ionomer resin | Resin name | 8 | 9 | 10 | 11 | 12 | 13 | 14 |
| | A | HIMILAN 1605 | 15 | 20 | 75 | 15 | 45 | | 50 |
| | B | Resin (3) | 65 | | 15 | | | | |
| | B | HIMILAN 1706 | | 20 | | 40 | 10 | 50 | |
| | C | Resin (1) | 20 | | 10 | | | | 50 |
| | C | Resin (2) | | 60 | | 45 | 55 | 50 | |
| | Melt index of cover resin | | 1.8 | 1.1 | 2.4 | 1.0 | 1.3 | 0.9 | 2.3 |
| | Hardness (Shore D) of cover resin | | 69 | 69 | 69 | 68 | 68 | 68 | 69 |
| | Ball weight (g) | | 45.3 | 45.2 | 45.4 | 45.2 | 45.3 | 45.3 | 45.4 |
| | Ball compression (PGA) | | 99 | 99 | 98 | 99 | 99 | 97 | 98 |
| | Ball initial velocity (feet/sec.) | | 253.7 | 253.8 | 253.8 | 253.7 | 253.8 | 253.6 | 253.8 |
| | Durability | | 99 | 99 | 99 | 97 | 99 | 96 | 98 |
| | Low temperature durability | | No cracks | No cracks | 50% cracks | No cracks | No cracks | No cracks | No cracks |

[1] HIMILAN 1605 available from Du Pont-Mitsui Polychemicals Company, Ltd. which contains methacrylic acid in an amount of about 15% by weight. The neutralizing ion is sodium and neutralizing amount is about 30 mol %. It has a melt index of 2.8.
[2] Ionomer resin (3); The neutralizing ion is magnesium and neutralizing amount is about 45 mol %. It has a melt index of 1.9.
[3] HIMILAN 1706 available from Du Pont-Mitsui Polychemicals Company, Ltd. which contains methacrylic acid in an amount of about 15% by weight. The neutralizing ion is zinc and neutralizing amount is about 60 mol %. It has a melt index of 0.9.
[4] Ionomer resin (1); the neutralizing ion is magnesium and magnesium and neutralizing amount is about 45 mol %. It has a melt index of 0.9.
[5] Ionomer resin (2); the neutralizing ion is magnesium and zinc and neutralizing amount is about 45 mol %. It has a melt index of 0.9.
[6] HIMILAN 1555 available from Du Pont-Mitsui Polychemicals Company, Ltd. which contains methacrylic acid in an amount of about 11% by weight. The neutralizing ion is sodium and neutralizing amount is about 35 mol %. It has a melt index of 10.0.
[7] HIMILAN 1557 available from Du Pont-Mitsui Polychemicals Company, Ltd. which contains methacrylic acid in an amount of about 11% by weight. The neutralizing ion is zinc and neutralizing amount is about 55 mol %. It has a melt index of 5.0.
[8] According to R & A initial velocity measuring method.
[9] A golf ball was struck to a board at a speed of 45 m/s at a temperature of 23° C. and number of strikings was determined until the ball was cracked. The number is expressed as an index number when the number of Example 1 is made 100.
[10] A golf ball was struck ten times to a board at a speed of 45 m/s at a temperature of −30° C. Evaluation is made whether the ball is cracked.

Physical properties were determined as follow:
(a) Melt index; JIS-K6760 at 190° C. at a load of 2160 g.
(b) Neutralized metal; An ionomer resin was burned to ashes which were added into a hydrochloric acid solution. An amount of the metal ion was then determined by an atomic spectrophotometry.
(c) Acid content; An ionomer resin was melted in tetrahydrofuran at an elevated temperature at which an amount [COOH] of the remaining carboxyl groups was determined by titrating with a potassium hydroxide solution having a known concentration. It was then added to the carboxyl metal salt ([COOM]) from the metal ion amount of the above (b) and an acid content was obtained therefrom.
(d) Neutralized amount; Calculated from the following formula $$\text{Neutralized amount} = \frac{[COOM]}{[COOH] + [COOM]} \times 100$$

In another method, a logarithm of an IR absorption of carboxylates (metal salt) (1550–1600 cm$^{-1}$) / an IR absorption of carboxyl groups (1700 cm$^{-1}$) is expressed as a percentage of neutralized carboxyl group in the ethylene-methacrylic acid copolymer. The neutralized amount according to the ratio is determined by a standard titrating method.

According the above Examples and Comparative Examples, the ionomer resin HIMILAN 1605 is not good for practical use because of poor low temperature durability. In order to improve the resin, it is proposed to neutralize with two different sort of ions, as the ionomer resins (1) and (2), or to blend two different ionomer resins, as Comparative Examples 6 and 7. Golf balls which are commercially available from other golf ball manufacturers are almost produced based on the above proposed method.

As is apparent from Examples 1 to 4, the ionomer resin which blends three ionomer resins in a specific amount ratio exhibits excellent physical properties for golf balls. The specific amount ratio of the present invention is existent within the diagonal line portion in FIG. 1. If the amount ratios are outside of the diagonal line portion, initial velocity is deteriorated. In the diagonal line portion, three ionomer resins optimize their functions, but in the outside of the diagonal line portion, physical properties of each ionomer resin come to the front.

What is claimed is:
1. A golf ball comprising a core and a cover covering said core, wherein said cover has a melt index of 0.5 to 3.0 and a Shore D hardness of at least 65, and is prepared by mixing
(A) an ionomer resin having a melt index of 0.5 to 5.0 and a Shore D hardness of at least 65, prepared from an ethylene-methacrylic acid copolymer containing 10 to 20% by weight of methacrylic acid with the balance ethylene of which 20 to 70 mol % of the carboxyl groups is neutralized with sodium ions,
(B) an ionomer resin having a melt index of 0.5 to 3.0 and a Shore D harness of at least 65, prepared from said eithylene-methacrylic acid copolymer of which 40 to 70 mol % of the carboxyl groups is neutralized with zinc ions or magnesium ions, and
(C) an ionomer resin having a melt index of 0.1 to 2.0 and a Shore D hardness of at least 65, prepared from said ethylene-methacrylic acid copolymer of which 10 to 50 mol % of the carboxyl groups is neutralized with sodium ions and 10 to 50 mol % of the carboxyl groups is neutralized with zinc ions or magnesium ions,
in an amount ratio sufficient to meet the following relationships;

$$30 \leq A \leq 60$$

$$10 \leq B \leq 50$$

$$5 \leq C \leq 40$$

$$A + B + C = 100 (\% \text{ by weight}).$$

2. The golf ball according to claim 1 wherein said ionomer resin A has a melt index of 0.8 to 3.0.

3. The golf ball according to claim 1 wherein said ionomer resin B has carboxyl groups neutralized with zinc or magnesium ion in an amount of 50 to 60 mol %.

4. The golf ball according to claim 1 wherein said ionomer resin B is prepared by treating the sodium neutralized ionomer resin to remove sodium ions and then mixing the zinc or magnesium ion sources.

5. The golf ball according to claim 4 wherein said zinc ion sources are zinc carbonate, zinc acetate or the like.

6. The golf ball according to claim 4 wherein said magnesium ion sources are magnesium hydroxide, magnesium oxide or magnesium acetate.

7. The golf ball according to claim 1 wherein said ionomer resin B has a melt index of 0.8 to 2.0.

8. The golf ball according to claim 1 wherein said ionomer resin C is prepared by further neutralizing with zinc or magnesium ion an ionomer resin which has been neutralized with sodium ion in an amount of 10 to 50 mol % based on the total amount of the carboxyl group of the ionomer resin.

9. The golf ball according to claim 1 wherein said ionomer resin C has a melt index of 0.5 to 1.5.

10. The golf ball according to claim 1 wherein the mixing of the ionomer resins A, B and C is carried out using an extruder.

11. The golf ball according to claim 2 wherein said ionomer resin B has carboxyl groups neutralized with zinc or magnesium ion in an amount of 50 to 60 mol %.

12. The golf ball according to claim 2, wherein said ionomer resin B has a melt index of 0.8 to 2.0.

13. The golf ball according to claim 11 wherein said ionomer resin C is prepared by further neutralizing with zinc or magnesium ion an ionomer resin which has been neutralized with sodium ion in an amount of 10 to 50 mol % based on the total amount of the carboxyl groups of the ionomer resin.

14. The golf ball according to claim 11 wherein said ionomer resin C has a melt index of 0.5 to 1.5.

15. The golf ball according to claim 12 wherein said ionomer resin C is prepared by further neutralizing with zinc or magnesium ion an ionomer resin which has been neutralized with sodium ion in an amount of 10 to 50 mol % based on the total amount of the carboxyl groups of the ionomer resin.

16. The golf ball according to claim 12 wherein said ionomer resin C has a melt index of 0.5 to 1.5.

17. The golf ball according to claim 1 wherein said cover has a melt index of 1.0 to 2.5.

* * * * *